United States Patent
Sykes et al.

(10) Patent No.: US 10,662,848 B2
(45) Date of Patent: May 26, 2020

(54) SCR DOSING SYSTEM

(71) Applicant: DELPHI TECHNOLOGIES IP LIMITED, St. Michael (BB)

(72) Inventors: Martin A. P. Sykes, Rainham (GB); Simon R. Panteny, Rochester (GB); Philip Turobin-Harrington, Minster (GB)

(73) Assignee: DELPHI TECHNOLOGIES IP LIMITED (BB)

(*) Notice: Subject to any disclaimer, the term of this patent is extended or adjusted under 35 U.S.C. 154(b) by 6 days.

(21) Appl. No.: 16/071,727

(22) PCT Filed: Jan. 13, 2017

(86) PCT No.: PCT/EP2017/050650
§ 371 (c)(1),
(2) Date: Jul. 20, 2018

(87) PCT Pub. No.: WO2017/129420
PCT Pub. Date: Aug. 3, 2017

(65) Prior Publication Data
US 2019/0032532 A1 Jan. 31, 2019

(30) Foreign Application Priority Data
Jan. 28, 2016 (GB) .................................. 1601542.2

(51) Int. Cl.
*F01N 3/20* (2006.01)

(52) U.S. Cl.
CPC ........... *F01N 3/208* (2013.01); *F01N 3/2066* (2013.01); *F01N 2610/02* (2013.01); *F01N 2610/144* (2013.01); *F01N 2610/146* (2013.01); *F01N 2610/1493* (2013.01); *F01N 2900/1808* (2013.01); *Y02T 10/24* (2013.01)

(58) Field of Classification Search
CPC .... F01N 3/2066; F01N 3/208; F01N 2610/02; F01N 2610/144; F01N 2610/146; F01N 2610/1493
See application file for complete search history.

(56) References Cited

U.S. PATENT DOCUMENTS

2006/0042234 A1  3/2006  Song et al.
2009/0101656 A1  4/2009  Leonard
(Continued)

FOREIGN PATENT DOCUMENTS

CN   104587830 A   5/2015
DE   102011118626 A1   5/2013
EP   2905441 A1   8/2015

*Primary Examiner* — Audrey K Bradley
(74) *Attorney, Agent, or Firm* — Joshua M. Haines

(57) ABSTRACT

A method is provided for purging a selective catalytic reduction dosing system having a urea reservoir and a urea delivery module including at least one pump and a dosing injector arranged to spray urea into an engine exhaust pipe and a feedline. The method includes: (1) activating a reverse pump or a pump in a reverse direction; (2) opening the dosing injector; (3) stopping the reverse pump or reverse direction of the pump and closing the dosing injector; (4) activating a forward pump or a forward direction of the pump; (5) stopping the forward pump or forward direction of the pump and opening the dosing injector; and activating the reverse pump or reverse direction of the pump.

15 Claims, 5 Drawing Sheets

(56) References Cited

U.S. PATENT DOCUMENTS

| | | | |
|---|---|---|---|
| 2010/0115928 A1* | 5/2010 | Asaura | B01D 53/90 60/287 |
| 2012/0269705 A1 | 10/2012 | Jensen et al. | |
| 2013/0133309 A1* | 5/2013 | Zimmerman | F02D 41/222 60/274 |
| 2013/0192207 A1* | 8/2013 | Chiba | F01N 3/208 60/274 |
| 2015/0047326 A1 | 2/2015 | Gardner et al. | |
| 2015/0204225 A1 | 7/2015 | Wu et al. | |
| 2015/0361857 A1 | 12/2015 | Matsuo et al. | |
| 2016/0131004 A1 | 5/2016 | Hodgson et al. | |

* cited by examiner

SCR DOSING SYSTEM

CROSS REFERENCE TO RELATED APPLICATIONS

This application is a national stage application under 35 USC 371 of PCT Application No. PCT/EP2017/050650 having an international filing date of Jan. 13, 2017, which is designated in the United States and which claimed the benefit of GB Patent Application No. 1601542.2 filed on Jan. 28, 2016, the entire disclosures of each are hereby incorporated by reference in their entirety.

TECHNICAL FIELD

The present invention relates generally to the field of selective catalytic reduction dosing systems. More particularly, but not exclusively, the present invention concerns a purging method for selective catalytic reduction dosing systems.

DESCRIPTION OF THE RELATED ART

Typical selective catalytic reduction dosing systems comprise a urea delivery module, a dosing injector and a catalyst. The urea delivery module sends a dose of urea down a feed line to the dosing injector, where it is subjected to high pressures and evacuated as a spray through the nozzle into the exhaust pipe. Once the spray is in the exhaust pipe, the spray mixes with the exhaust gasses and travels down the exhaust pipe to the catalyst, where selective catalytic reduction takes place converting nitrogen oxides, into diatomic nitrogen, N2, water and carbon dioxide for expulsion into the atmosphere.

Such dosing systems need to be purged of urea before the engine is turned off ('key off') to remove the urea from the pressurised feedline and the dosing injector. Should urea remain after key off and freezing conditions occur, this may result in damage to the components. In addition, frozen urea can cause a plug in the dosing injector nozzle causing it to stick in a closed configuration.

Currently, it is known to use a purging pump as part of a selective catalytic reduction dosing system. The purging pump drives urea back from the feedline and into the urea tank. It is common to open the dosing injector as part of the purging process to draw urea back through the dosing injector with the purging pump. However, the known purging process does not always completely purge the dosing injector and the feedline of all urea leaving them vulnerable in freezing conditions.

It is an object of the present invention to address one or more of the problems of known designs.

Therefore, it is now desired to provide an improved purging process for a selective catalytic reduction dosing system.

SUMMARY OF THE INVENTION

In a first aspect of the present invention there is provided a method for purging a selective catalytic reduction dosing system having a urea reservoir, a urea delivery module comprising at least one pump, a dosing injector arranged to spray urea into an engine exhaust pipe and a feedline extending from the dosing injector to the urea delivery module, the method comprising the steps of:

1. Activating a reverse pump/a pump in a reverse direction to reduce the urea pressure in preparation to draw fluid/gas into the urea delivery module;
2. Opening the dosing injector to allow fluid/gas to flow into the feedline from the exhaust pipe;
3. Stopping the reverse pump/reverse direction of the pump and closing the dosing injector;
4. Activating a forward pump/a forward direction of the pump;
5. Stopping the forward pump/forward direction of the pump and opening the dosing injector; and
6. Activating the reverse pump/reverse direction of the pump.

With this arrangement, steps (1) and (2) function to draw a large volume of air from the exhaust pipe into the system, which is then highly pressurised in steps (3) and (4). By subsequently opening the dosing injector in step (5), the pressurised air is blasted out of the dosing injector, taking with it and unsettling any residual urea that was present in the urea delivery module, the feedline and the dosing injector. A final stage of activating the reverse direction of the pump in step (6) draws any remaining urea back into the urea reservoir.

Steps (1) and (2) may take place simultaneously.

Preferably in step (3), the reverse pump/reverse direction of the pump is stopped before the dosing injector is closed. Alternatively, the reverse pump/reverse direction of the pump may be stopped after the dosing injector is closed. In a further alternative, the reverse pump/reverse direction of the pump may be stopped at the same time that the dosing injector is closed.

Where there is operation of a forward pump and a reverse pump, steps (3) and (4) may take place simultaneously.

Preferably in step (5), the operation of the forward pump/forward direction of the pump is stopped before the dosing injector is opened. Alternatively, the operation of the forward pump/forward direction of the pump may be stopped after the dosing injector is opened. In a further alternative, the operation of the forward pump/forward direction of the pump may be stopped at the same time that the dosing injector is opened.

Preferably, the method comprises an additional step (7) of closing the dosing injector. Steps (6) and (7) may occur simultaneously. Alternatively, step (7) may occur subsequently.

Following step (7), the forward pump/forward direction of the pump may be activated to prepare the selective catalytic reduction dosing system for a subsequent key-on event. The forward pump maybe subsequently deactivated to complete the purge process.

Preferably, the method comprises operation of a single pump operable in forward and reverse directions.

Preferably, where a single pump is employed, the method may comprise the operation of a purge valve to control the direction of flow in the forward or reverse direction. Therefore, the method may further comprises a precursor step before steps (1) and (6) of activating a crossover mode of the purge valve. The method may further comprise an intervening step before step (4) and/or step (8) of activating a normal mode of the purge valve.

Alternatively, the method may comprise the operation of a forward pump and a reverse pump. The activation of the forward pump may take place in step (4) and/or step (8). The activation of the reverse pump may be take place in steps (1) and/or (6).

Preferably, the method comprises detecting a first predetermined pressure in the system before executing step (3).

Preferably, the first predetermined pressure comprises approximately 80 kPa to approximately 100 kPa. Alternatively, the method comprises lapsing a predetermined period of time between steps (2) and (3). The predetermined period of time may comprise approximately 5 seconds to approximately 30 seconds.

Preferably, the method comprises detecting a second predetermined pressure in the system before executing step (5). Preferably, the second predetermined pressure comprises approximately 200 kPa to approximately 500 kPa. Alternatively, the method comprises lapsing a predetermined period of time between steps (4) and (5). The predetermined period of time may comprise approximately 1 to approximately 5 seconds.

Preferably, the method comprises repeating steps (1) to (5) one or more times before executing step (6).

In a second aspect of the present invention there is provided selective catalytic reduction dosing system comprising a urea reservoir, a urea delivery module comprising at least one pump, a dosing injector arranged to spray urea into an engine exhaust pipe and a feedline extending from the dosing injector to the urea delivery module, the selective catalytic reduction dosing system being operable to:

Activate a reverse pump/a pump in a reverse direction to reduce the urea pressure in preparation to draw fluid/gas into the urea delivery module;

Open the dosing injector to allow fluid/gas to flow into the feedline from the exhaust pipe;

Stop the reverse pump/reverse direction of the pump and close the dosing injector;

Activate a forward pump/a forward direction of the pump;

Stop the forward pump/forward direction of the second and open the dosing injector; and Activate the reverse pump/reverse direction of the pump.

Preferably, the system comprises a single pump operable in forward and reverse directions.

Preferably, where a single pump is involved, the system comprises a purge valve to control the direction of flow in the forward or reverse direction.

Alternatively, the system may comprise a forward pump and a reverse pump. The forward pump may be operable in step (4) and/or step (8). The reverse pump may be operable in steps (1) and/or (6).

Preferably, the system comprises a pressure sensor operable to detect a first predetermined pressure in the system. The pressure sensor may be operable to detect a second predetermined pressure in the system.

Preferably, the system comprises a control unit. Preferably, the control unit is programmed to execute the method as described in the first aspect of the invention.

It is to be appreciated that the features described in relation to the first aspect of the invention also apply to the second aspect of the invention.

BRIEF DESCRIPTION OF THE DRAWINGS

For a better understanding of the invention, and to show how exemplary embodiments may be carried into effect, reference will now be made to the accompanying drawings in which.

DETAILED DESCRIPTION OF THE INVENTION

Figure 1:
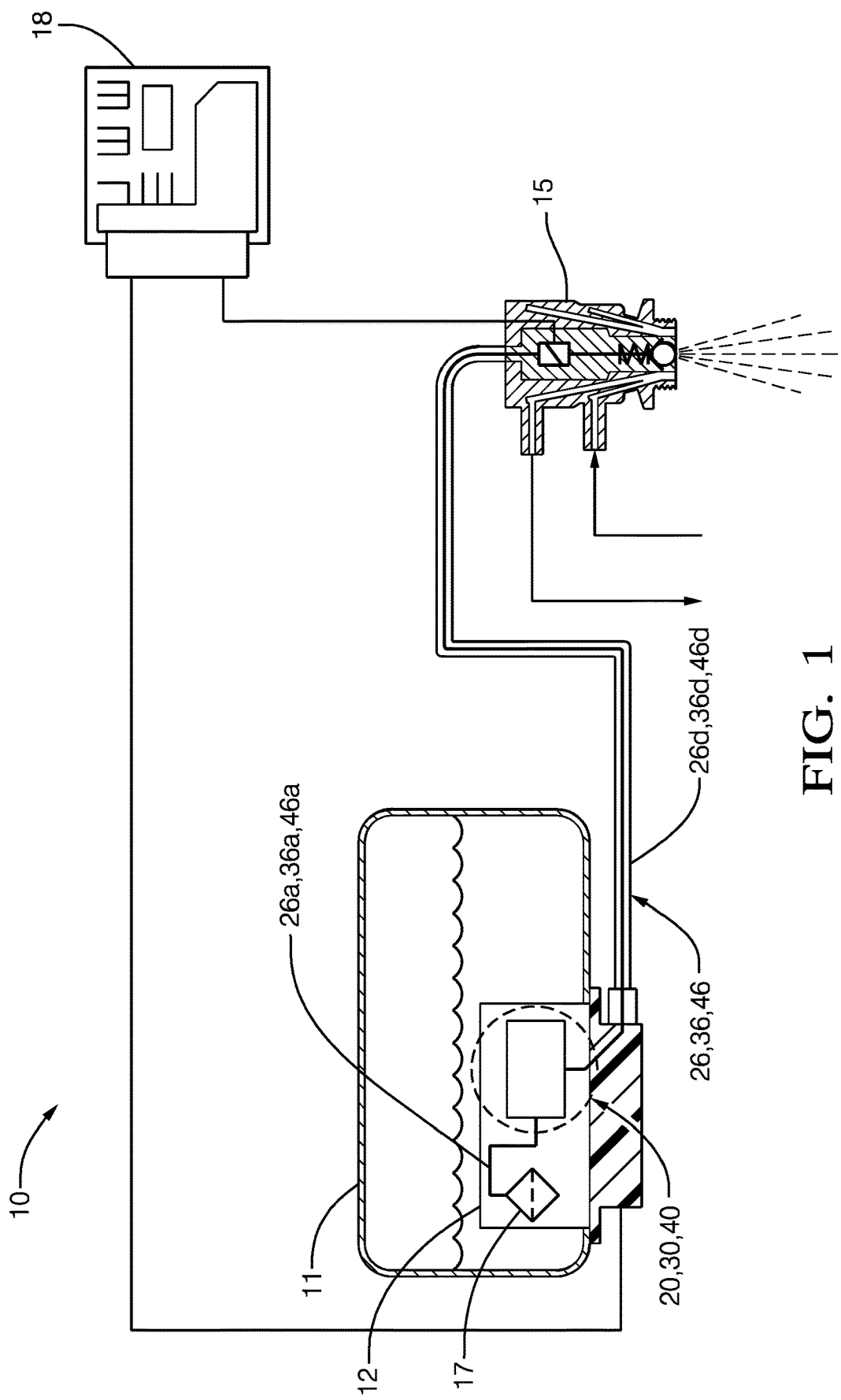
FIG. 1 is a schematic view of a selective catalytic reduction dosing system according to the invention.

The invention is shown in FIGS. 1 to 6. The invention relates to a method for purging a selective catalytic reduction dosing system 10, the selective catalytic reduction dosing system 10 having a urea reservoir 11, a urea delivery module 12 comprising at least one pump 23, 24, 33, 43, a dosing injector 15 arranged to spray urea into an engine exhaust pipe (not shown) and a feedline 26, 36, 46 extending from the dosing injector 15 to the urea delivery module 12, the method comprising the steps of:

1. Activating a reverse pump/a pump 23, 33, 43 in a reverse direction to reduce the urea pressure in preparation to draw fluid/gas into the urea delivery module 12;
2. Opening the dosing injector 15 to allow fluid/gas to flow into the feedline 26, 36, 46 from the exhaust pipe;
3. Stopping the reverse pump/pump 23, 33, 43 in the reverse direction and closing the dosing injector 15;
4. Activating a forward pump/the pump 24, 33, 43 in a forward direction;
5. Stopping the forward pump/pump 24, 33, 43 in the forward direction and opening the dosing injector 15; and
6. Activating the reverse pump/pump 23, 33, 43 in the reverse direction.

The selective catalytic reduction dosing system 10 further comprises an electronic programmable control unit 18 that is operable to control both the urea delivery module 12 and the dosing injector 15.

The urea delivery unit 12 comprises an inlet (not shown) for the intake of urea from the urea reservoir 11. Inward of the inlet, the urea delivery unit 12 comprises a filter 17 followed by a pump unit 20, 30, 40. The filter 17 is connected to the pump unit 20, 30, 40 via a first section 26a, 36a, 46a of feedline 26, 36, 46.

Figure 2:
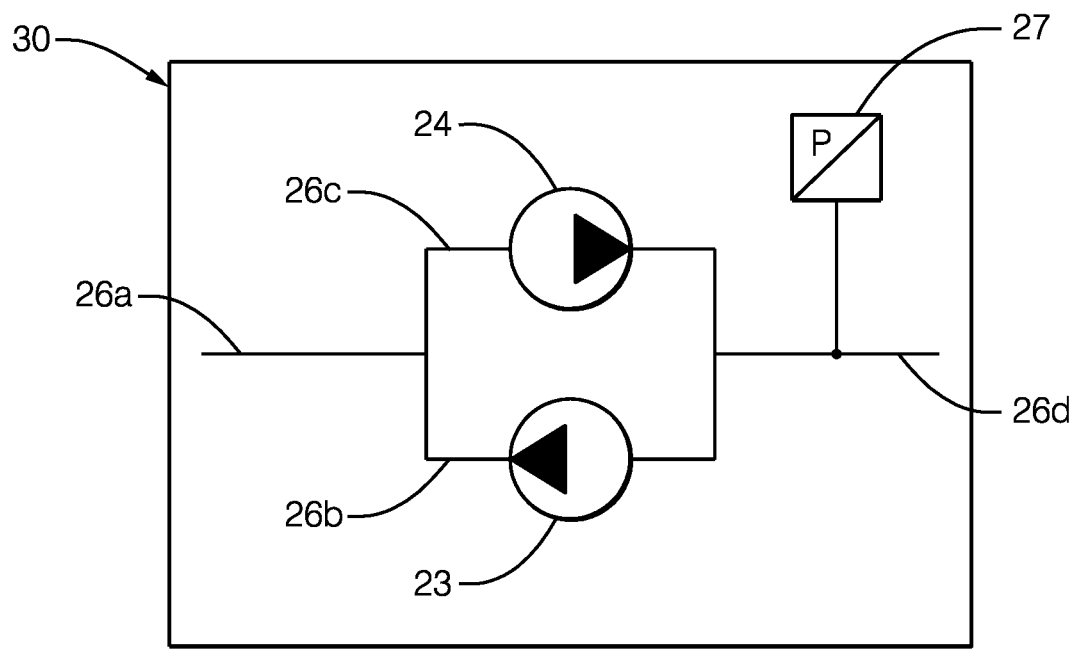
FIG. 2 is a schematic view of a selective catalytic reduction dosing system according to a first embodiment of the invention with a first pump arrangement.

As shown more clearly in FIG. 2, a first embodiment of the invention comprises a first embodiment of a pump unit 20 as part of the urea delivery unit 12.

The pump unit 20 comprises the reverse pump 23 and the forward pump 24 both connected to the first section 26a of feedline via diverting second and third sections 26b, 26c of feedline 26, 36, 46 respectively. The forward pump 24 is operable to effect the forward direction of pumping motion, whereas the reverse pump 23 is operable to effect the reverse direction of pumping motion. The selective activation of the pumps 23, 24 is controlled via the electronic programmable control unit 18.

Following both the reverse and forward pumps 23, 24, the second and third sections 26b, 26c of feedline 26b, 26c merge into a final section of high-pressure and heated feedline 26d that connects with the dosing injector 15. A pressure sensor 27 is connected to the final section of feedline 26d at the start thereof close to the merge.

In normal use, the urea delivery unit 12 takes a feed of urea from the urea reservoir 11 and passes it through the filter and the first section of feedline 26a to the pump unit 20. Since the forward pump 24 is operable under the electronic programmable control unit 18, the urea is drawn through the third section of feedline 26c, through the forward pump 24 and pushed down the final section of feedline 26d to the dosing injector 15, from which it is expelled as spray into an exhaust pipe.

Figure 5:
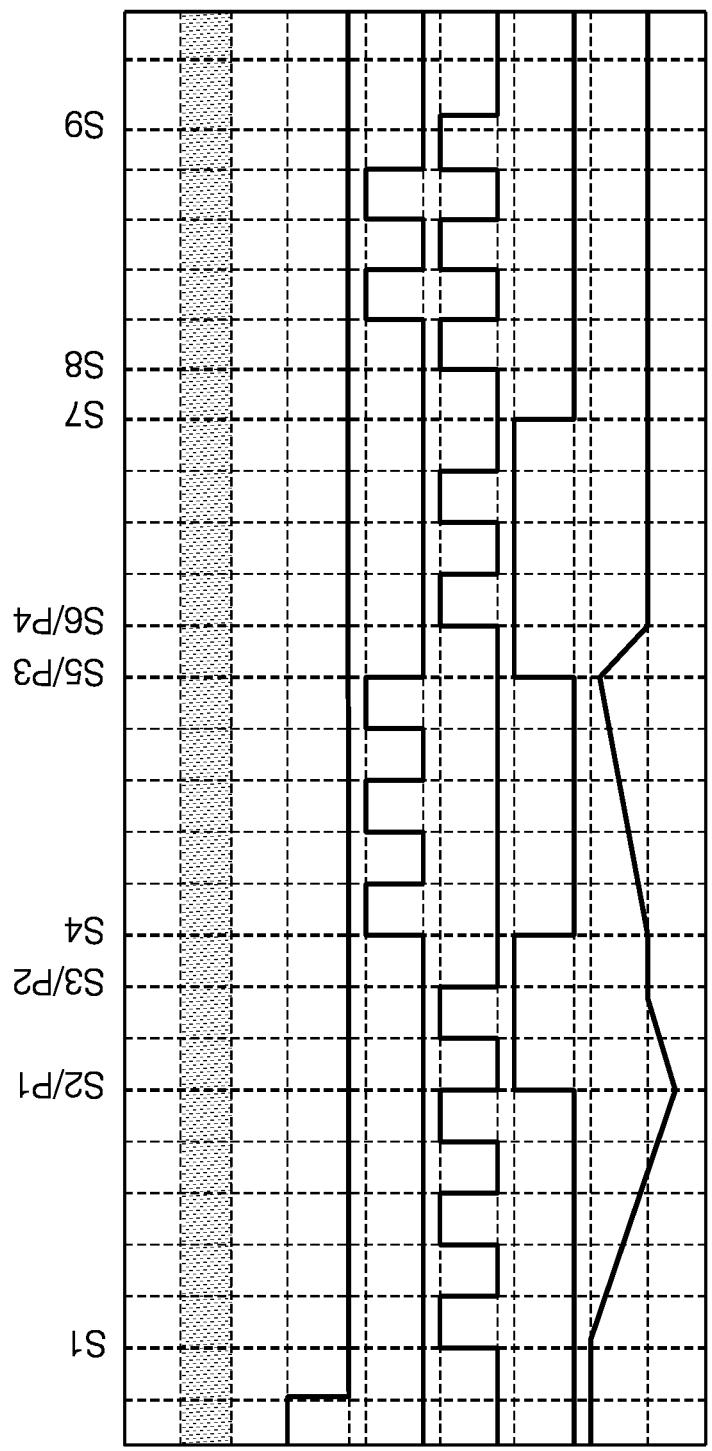
FIG. 5 is a schematic representation of a first timeline of events in a system of FIG. 2.
Figure 6:
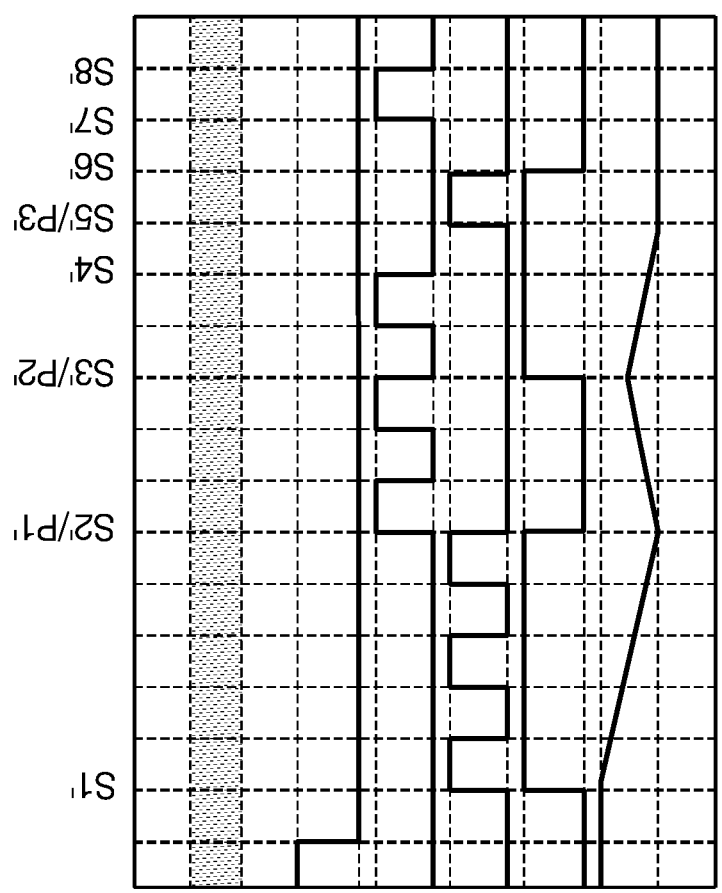
FIG. 6 is a schematic representation of a second timeline of events in a system of FIG. 2.

Once the engine is turned off ('Key off'), the purge process is activated. FIGS. 5 and 6 show two possible sequences of events.

In the sequence of FIG. 5, the electronic programmable control unit 18 first activates the reverse pump 23 (S1). The pressure of the urea present in the feedline 26 is lowered. Once a first predetermined pressure P1 (generally below atmospheric pressure) is detected in the final section of feedline 26d by the pressure sensor 27 and communicated to the electronic programmable control unit 18, the dosing injector 15 is opened (S2), which allows urea to flow back to the reservoir 11 and fluid/gas to flow into final section 26d of feedline 26d, followed by the second section 26b of feedline 26 from the exhaust pipe, thereby increasing the pressure therein. Once a second predetermined higher pressure P2 (typically approximately atmospheric pressure) is detected by the pressure sensor 27 and communicated to the electronic programmable control unit 18, the reverse pump 23 is ceased and the dosing injector 15 is closed shortly afterwards (S3). By this time, enough fluid/gas should have been drawn into the feedline 26d. The forward pump 24 is activated (S4) by the electronic programmable control unit 18 which pressurises the gas drawn into the final section 26d of feedline 26. Once a third predetermined higher pressure P3 (typically above atmospheric pressure) is detected by the pressure sensor 27 and communicated to the electronic programmable control unit 18, the forward pump 24 is halted (S5). The dosing injector 15 is opened (S5) and due to the high pressure in the final section 26d of feedline 26, the gas is expelled at speed, taking with it any residual urea in the feedline 26d and the dosing injector 15. A fourth predetermined lower pressure P4 (but again typically above atmospheric pressure) is detected by the pressure sensor 27 and communicated to the electronic programmable control unit 18 causing it to activate the reverse pump 23 (S6). The reverse pump 23 draws gas in through the open dosing injector 15 through the final section 26d and second section 26b of feedline 26 and pushes the gas through the first section of feedline 26a back towards the urea reservoir 11, thereby clearing the first, second and final sections 26a, 26b, 26d of feedline 26 of residual urea. During this time, pressure stays constant. The dosing injector 15 is subsequently closed S7 and the reverse pump 23, followed by the forward pump 24 are activated to run for a short while simultaneously (S8). The forward pump 24 is deactivated shortly before the reverse pump 23 is deactivated (S9).

In an alternative sequence of events as shown in FIG. 6, the electronic programmable control unit 18 first activates the reverse pump 23 at the same time as opening the dosing injector 15 (S1'). The urea present in the feedline 26 is drawn back to the urea reservoir 11. The drawing of gas through the dosing injector 15 into the final section 26d of feedline 26, followed by the second section 26b of feedline 26 by the reverse pump 23, results in a falling pressure therein. Once a first predetermined low pressure P1' is detected in the final section of feedline 26d by the pressure sensor 27 and communicated to the electronic programmable control unit 18, the dosing injector 15 is closed and the reverse pump 23 is deactivated (S2'). At the same time, the forward pump 24 is activated (S2') by the electronic programmable control unit 18 which pressurises the gas drawn into the final section 26d of feedline 26. Once a second predetermined higher pressure P2' is detected by the pressure sensor 27 and communicated to the electronic programmable control unit 18, the dosing injector 15 is opened (S3') and due to the high pressure in the final section 26d of feedline 26, the gas is expelled at speed, taking with it any residual urea in the feedline 26d and the dosing injector 15. The forward pump 24 is halted (S4') as the dosing injector 15 remains open. A third predetermined lower pressure P3' is detected by the pressure sensor 27 and communicated to the electronic programmable control unit 18 causing it to activate the reverse pump 23 (S5'). The reverse pump 23 draws gas in through the open dosing injector 15 through the final section 26d and second section 26b of feedline 26 and pushes the gas through the first section of feedline 26a back towards the urea reservoir 11, thereby clearing the first, second and final sections 26a, 26b, 26d of feedline 26 of residual urea. During this time, pressure stays constant. The dosing injector 15 is subsequently closed along with the deactivation of the reverse pump 23 (S6'). The forward pump 24 is activated (S7') to run for a short while before being deactivated (S8').

Figure 3:
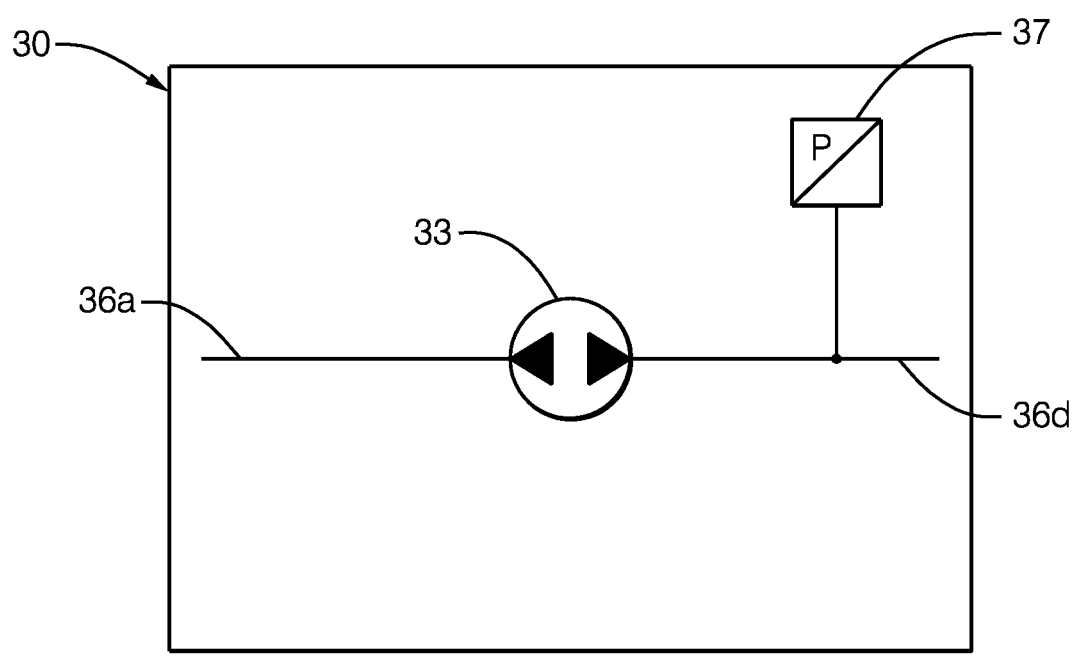
FIG. 3 is a schematic view of a selective catalytic reduction dosing system according to a second embodiment of the invention with a second pump arrangement.

As shown more clearly in FIG. 3, a second embodiment of the invention comprises a pump unit 30 as part of the urea delivery unit 12.

The pump unit 30 comprises a single pump 33 connected to the first section 36a of feedline 36. The pump 33 is bidirectional and therefore, operable to effect the forward and reverse directions of pumping motion. The direction of the pump 33 is controlled via the selective operation of a purge valve 34 under the control of the electronic programmable control unit 18.

The pump 33 connects directly to a final section 36d of feedline 36 which is high-pressure and heated feedline 36d that connects with the dosing injector 15. A pressure sensor 37 is connected to the final section 33d of feedline 36 at the start thereof.

In normal use, the urea delivery unit 12 takes a feed of urea from the urea reservoir 11 and passes it through the filter 17 and the first section 36a of feedline 36 to the pump unit 30. Since the pump 33 is operable in a forward direction under the electronic programmable control unit 18, the urea is drawn through the first section 36a, through the pump 33 and pushed down the final section 36d of feedline 36 to the dosing injector 15, from which it is expelled as spray into an exhaust pipe.

Once the engine is turned off ('Key off'), the purge process is activated, which follows a similar sequence of steps as shown in FIG. 5, up to S7. In this mode, the electronic programmable control unit 18 first activates the pump 33 in a reverse direction to lower the pressure of the urea in the feedline 36 (S1). Once a first predetermined pressure P1 is detected in the final section 36d of feedline 36 by the pressure sensor 37 and communicated to the electronic programmable control unit 18, the dosing injector 15 is opened (S2), which allows urea to flow back to the reservoir 11 and gas to flow into final section 36d of feedline 36 from the exhaust pipe, thereby increasing the pressure therein. Once a second predetermined higher pressure P2 is detected by the pressure sensor 37 and communicated to the electronic programmable control unit 18, the reverse direction of the pump 33 is ceased S3 and the dosing injector 15 is subsequently closed. The forward direction of the pump 34 is activated (S4) by the electronic programmable control unit 18 which pressurises the gas drawn into the final section 36d of feedline 36. Once a third predetermined high pressure P3 is detected by the pressure sensor 37 and communicated to the electronic programmable control unit 18, the forward direction of the pump 33 is halted (S5). The dosing injector 15 is then opened and due to the high pressure in the final section 36d of feedline 36, the gas is expelled at speed, taking with it any residual urea in the feedline 36d and the dosing injector 15. A fourth predetermined pressure P4 is detected by the pressure sensor 37 and communicated to the electronic programmable control unit 18 causing it to activate the reverse direction of the pump 33 (S6). The reverse direction of the pump 33 draws gas in through the open dosing injector 15 through the final section 36d of feedline 36 and pushes the gas through the first section of feedline 36a back towards the urea reservoir 11, thereby clearing the first and final sections 36a, 36d of feedline 36 of residual urea. The dosing injector 15 is finally closed (S7).

Figure 4A:
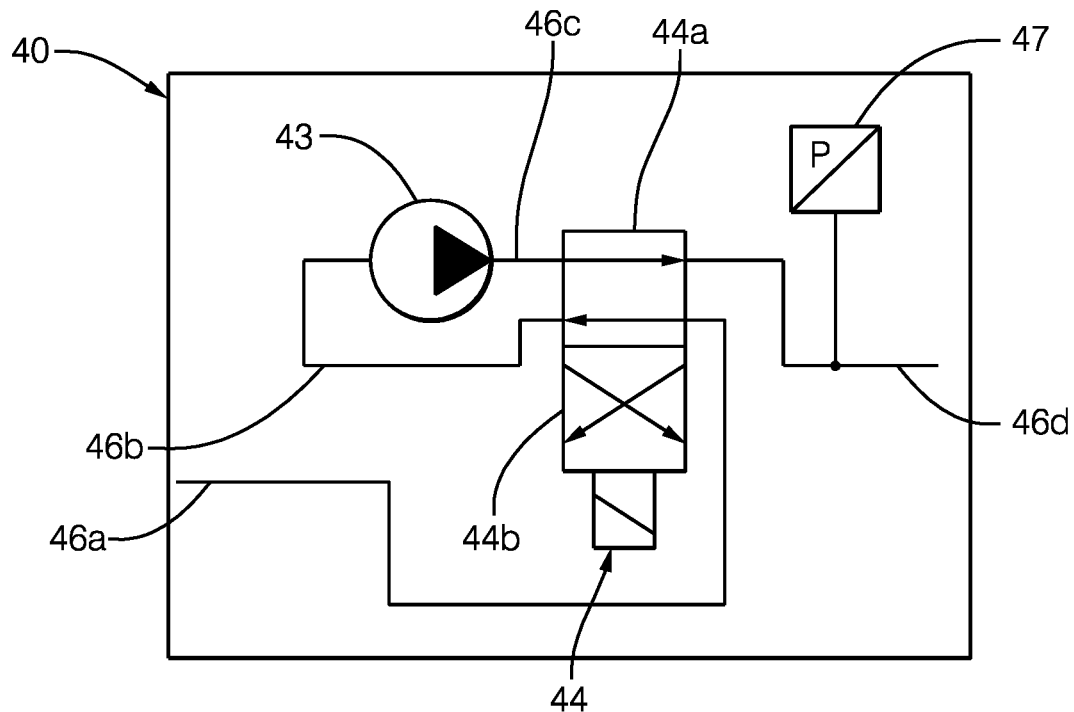
FIG. 4A is a schematic view of a selective catalytic reduction dosing system according to a third embodiment of the invention with a third pump arrangement in a forward mode.
Figure 4B:
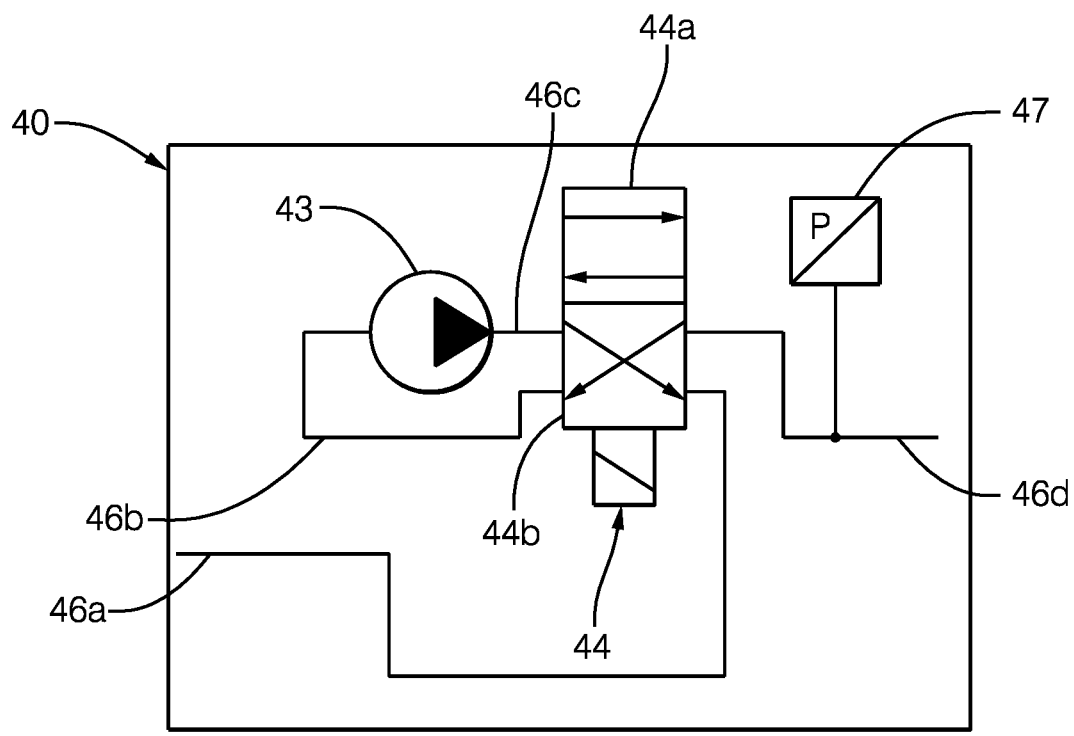
FIG. 4B is a schematic view of the pump arrangement of FIG. 4A in a reverse mode.

As shown more clearly in FIGS. 4A and 4B, a third embodiment of the invention comprises a third embodiment of a pump unit 40 as part of the urea delivery unit 12.

The pump unit 40 again comprises a single pump 43 connected to the first section 46a of feedline 46. The pump 33 is operable to provide the forward and reverse directions of pumping motion under the control of the electronic programmable control unit 18, the effect of which is controlled via the selective operation of a purge valve 44.

The first section 46a of feedline 46 passes through to the purge valve 44, followed by a second section 46b of feedline 46 leading to the pump 43. Following the pump 43, a third section 46c of feedline 46 connects the pump 43 with the purge valve 44. The purge valve 44 then connects with the final section 46d of high-pressure and heated feedline 46 that connects with the dosing injector 15. A pressure sensor 47 is connected to the final section of feedline 46d at the start thereof close to the purge valve 44.

The purge valve 44 comprises a solenoid operated hydraulic valve with normal and crossover flow.

The purge valve 44 comprises a forward (normal operation) pair of ports 44a allowing parallel bidirectional flow through the valve 44 both from the first section 46a to the second section 46b of feedline 46 and from the third section 46c to the fourth section 46d of feedline. The purge valve 44 also comprises a crossover (reverse purge operation) port 44b allowing flow through the valve 44 from the fourth section 46d to the second section 26b of feedline and from the third section 46c to the first section 46a of feedline 46.

In normal use, the urea delivery unit 12 takes a feed of urea from the urea reservoir 11 and passes it through the first section of feedline 46a to the purge valve 44. In normal operation, under the control of the electronic programmable control unit 18, the forward (normal operation) port 44a of the purge valve 44 is open and the crossover (reverse purge operation) port 44b is ineffective, allowing the urea to pass through the port 44a to the second section of feedline 46b, on to the pump 43, then from the third section 46c to the fourth section 46d of feedline 46. Once in the high temperature feedline 46d the urea passes to the dosing injector 15, from which it is expelled as spray into an exhaust pipe.

Once the engine is turned off ('Key off'), the purge process is activated, again following the sequence of steps of FIG. 5 up to S7. In this mode, the programmable control unit 18 switches the purge valve 44 to crossover port 44b. The flow pathway now comprises fourth section 46d—purge crossover port 44b—second section 46b—pump 43—third section 46c—purge crossover port 44b—first section 46a.

With the pump 43 operated in a reverse direction mode (S1), the pump 43 lowers the pressure of the urea in the feedline 46. Once a first predetermined pressure P1 is detected in the final section 46d of feedline 46 by the programmable control unit 18, the dosing injector 15 is opened (S2), which allows urea to flow back to the reservoir 11 and gas to flow through the final section 46d of feedline 46, to the second section 46b (via the crossover port 44b) from the exhaust pipe, thereby increasing the pressure in the final section 46d of feedline 46. Once a second predetermined pressure P2 is detected by the pressure sensor 47 and communicated to the programmable control unit 18, the reverse direction of the pump 43 is ceased and the dosing injector 15 is closed (S3). The purge valve 44 is switched to the bidirectional purge port 44a and the forward direction of the pump 43 is activated (S4) by the programmable control unit 18 which pressurises the gas already drawn into the final section 46d of feedline 46. Once a third predetermined high pressure P3 is detected, the forward direction of the pump 43 is halted (S5). The dosing injector 15 is then opened and due to the high pressure in the feedline 46d, the gas is expelled at speed, taking with it any residual urea in the feedline 46d and the dosing injector 15. A fourth predetermined pressure P4 is detected by the pressure sensor 47 and communicated to the programmable control unit 18. The purge valve 44 is switched to the crossover purge port 44b and the reverse direction of the pump 43 is activated (S6). The pump 43 pump 43 draws gas through the final section 46d of feedline 46, to the second section 46b (via the crossover port 44b) and pushes it through the third section 46c and the first section 46a (via the crossover port 44b and back towards the urea reservoir 11, thereby clearing the feedline 46 of residual urea. The dosing injector 15 is finally closed (S7).

With the above arrangements, the purging method is more thorough, allowing pressurised air to blast urea first out of the downstream sections of feedline 26d, 36d, 46d and the dosing injector 15, followed by the upstream sections 26a-c, 36a, 46a-c of feedline 26, 36, 46. By clearing the downstream components into the exhaust pipe as a first stage, this ensures that air subsequently drawn in through downstream components (feedlines 26a-c, 36a, 46a-c and dosing injector 15), is relatively free of urea before clearing the upstream components.

Although a few preferred embodiments have been shown and described, it will be appreciated by those skilled in the art that various changes and modifications might be made without departing from the scope of the invention, as defined in the appended claims.

The invention claimed is:

1. A method for purging a selective catalytic reduction dosing system having a urea reservoir, a urea delivery module comprising at least one pump, a dosing injector arranged to spray urea into an engine exhaust pipe and a feedline extending from the dosing injector to the urea delivery module, the method comprising the steps of:
    (1) activating a reverse pump or a pump in a reverse direction to reduce urea pressure in preparation to draw fluid/gas into the urea delivery module;
    (2) opening the dosing injector to allow fluid/gas to flow into the feedline from the engine exhaust pipe;
    (3) stopping the reverse pump or the reverse direction of the pump and closing the dosing injector;
    (4) activating a forward pump or a forward direction of the pump;
    (5) stopping the forward pump or the forward direction of the pump and opening the dosing injector; and (6) activating the reverse pump or the reverse direction of the pump.

2. The method according to claim 1, wherein steps (1) and (2) take place simultaneously.

3. The method according to claim 1, wherein in step (3), the reverse pump or the reverse direction of the pump is stopped before the dosing injector is closed.

4. The method according to claim 1, wherein the reverse pump or the reverse direction of the pump is stopped at the same time that the dosing injector is closed.

5. The method according to claim 1, wherein step (3) includes stopping the reverse pump, step (4) includes activating the forward pump, and steps (3) and (4) take place simultaneously.

6. The method according to claim 1, wherein in step (5), the activation of the forward pump or the forward direction of the pump is stopped after the dosing injector is opened.

7. The method according to claim 1, wherein activation of the forward pump or the forward direction of the pump is stopped at the same time that the dosing injector is opened.

8. The method according to claim 1, wherein the method comprises an additional step (7) of closing the dosing injector.

9. The method according to claim 1, wherein the method comprises operation of a single pump in the forward direction and the reverse direction.

10. The method according to claim 9, wherein the method comprises operation of a purge valve to control direction of flow in the forward direction or the reverse direction.

11. The method according to claim 10, wherein the method further comprises a precursor step of activating a crossover mode of the purge valve before steps (1) and (6).

12. The method according to claim 11, wherein the method further comprises an intervening step of activating a normal mode of the purge valve before step (4) and/or the precursor step.

13. The method according to claim 1, wherein the method comprises operation of the forward pump and the reverse pump.

14. A selective catalytic reduction dosing system comprising:
a urea reservoir;
a urea delivery module comprising at least one pump;
a dosing injector arranged to spray urea into an engine exhaust pipe;
a feedline extending from the dosing injector to the urea delivery module; and
an electronic programmable control unit configured to:
(1) activate a reverse pump or a pump in a reverse direction to reduce the urea pressure in preparation to draw fluid/gas into the urea delivery module;
(2) open the dosing injector to allow fluid/gas to flow into the feedline from the exhaust pipe;
(3) stop the reverse pump or the reverse direction of the pump and close the dosing injector;
(4) activate a forward pump or a forward direction of the pump;
(5) stop the forward pump or the forward direction of the pump and open the dosing injector; and
(6) activate the reverse pump or the reverse direction of the pump.

15. The selective catalytic reduction dosing system according to claim 14, comprising a pressure sensor operable to detect at least a first predetermined pressure.

* * * * *